United States Patent
Hua et al.

(10) Patent No.: US 9,268,383 B2
(45) Date of Patent: Feb. 23, 2016

(54) POWER OVER ETHERNET METHOD, APPARATUS, DEVICE, AND SYSTEM

(71) Applicant: Huawei Technologies Co., Ltd., Shenzhen, Guangdong (CN)

(72) Inventors: Rui Hua, Nanjing (CN); Ying Gu, Nanjing (CN); Zhangqing He, Nanjing (CN); Jianguang Yang, Nanjing (CN); Tongqiang Cao, Nanjing (CN); Anhu Huang, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/464,514

(22) Filed: Aug. 20, 2014

(65) Prior Publication Data
US 2014/0359320 A1 Dec. 4, 2014

Related U.S. Application Data

(63) Continuation of application No. PCT/CN2012/087846, filed on Dec. 28, 2012.

(51) Int. Cl.
*G06F 1/00* (2006.01)
*G06F 1/26* (2006.01)
(Continued)

(52) U.S. Cl.
CPC ........ *G06F 1/26* (2013.01); *H04L 12/10* (2013.01); *H04L 12/413* (2013.01)

(58) Field of Classification Search
USPC .......................... 713/300, 310, 320, 330, 340
See application file for complete search history.

(56) References Cited

U.S. PATENT DOCUMENTS

2006/0112288 A1* 5/2006 Schindler ................... 713/300
2007/0136614 A1* 6/2007 Heath et al. ................ 713/300
(Continued)

FOREIGN PATENT DOCUMENTS

| CN | 101707380 A | 5/2010 |
| CN | 101820348 A | 9/2010 |
| CN | 101826970 A | 9/2010 |

OTHER PUBLICATIONS

"IEEE Standard for Information technology—Telecommunications and information exchange between systems—Local and metropolitan area networks—Specific requirements; Part 3: Carrier Sense Multiple Access with Collision Detection (CSMA/CD) Access Method and Physical Layer Specifications; Amendment: Data Terminal Equipment (DTE) Power via Media Dependent Interface (MDI)," IEEE Computer Society, Std 802.3af-2003, pp. i-121, Institute of Electrical and Electronics Engineers, New York, New York (Jun. 18, 2003).

(Continued)

*Primary Examiner* — Kim Huynh
*Assistant Examiner* — Paul J Yen
(74) *Attorney, Agent, or Firm* — Leydig, Voit & Mayer, Ltd.

(57) ABSTRACT

The application pertains to a method for an Ethernet power sourcing equipment to provide electric power to one or more Ethernet powered devices. A controlling apparatus determines a power supply mode of the Ethernet power sourcing equipment, and determines high-power Ethernet powered device(s) and low-power Ethernet powered device(s) among the Ethernet powered devices. The controlling apparatus sets a power supply priority for each of the Ethernet powered devices. In one power supply mode, the power supply priority of a high-power Ethernet powered device is same as or lower than the lowest priority of the low-power Ethernet powered device(s). When a new Ethernet powered device is connected to the Ethernet power sourcing equipment, the controlling apparatus determines whether to supply electric power to the new Ethernet powered device according to its power supply priority.

16 Claims, 2 Drawing Sheets

(51) Int. Cl.
 *H04L 12/10* (2006.01)
 *H04L 12/413* (2006.01)

(56) References Cited

U.S. PATENT DOCUMENTS

| | | | |
|---|---|---|---|
| 2009/0019300 A1* | 1/2009 | Matton et al. | 713/324 |
| 2009/0299538 A1 | 12/2009 | Suzuki | |
| 2010/0106985 A1 | 4/2010 | Panguluri et al. | |
| 2010/0171602 A1 | 7/2010 | Kabbara et al. | |

OTHER PUBLICATIONS

"IEEE Standard Information technology—Telecommunications and information exchange between systems—Local and metropolitan area networks—Specific requirements; Part 3: Carrier Sense Multiple Access with Collision Detection (CSMA/CD) Access Method and Physical Layer Specifications; Amendment 3: Data Terminal Equipment (DTE) Power via the Media Dependent Interface (MDI) Enhancements," IEEE Computer Society, Std 802.3at-2009, pp. i-123, Institute of Electrical and Electronics Engineers, New York, New York (Oct. 30, 2009).

* cited by examiner

POWER OVER ETHERNET METHOD, APPARATUS, DEVICE, AND SYSTEM

CROSS-REFERENCE TO RELATED APPLICATION

This application is a continuation of International Patent Application No. PCT/CN2012/087846, filed on Dec. 28, 2012, which is hereby incorporated by reference in its entirety.

TECHNICAL FIELD

The present application relates to the field of communications technologies, and in particular, to a power over Ethernet method, apparatus, device, and system.

BACKGROUND

Power over Ethernet (PoE) devices are classified into Ethernet power sourcing equipments and Ethernet powered devices. An Ethernet power sourcing equipment supplies power to an Ethernet powered device through an Ethernet cable. Generally, an Ethernet power sourcing equipment can provide a single Ethernet powered device with a maximum power of 30 watts (W). In recent years, as a cloud technology develops, increasing types of devices, such as cloud terminals, high definition cameras, and notebook computers, can be supported by remote power supply applications. Power requirements of these devices may be greater than 30 W, and may even reach 60 W or 90 W. After such a high-power Ethernet powered device is connected to a power over Ethernet system, the Ethernet power sourcing equipment may be overloaded, or the use of multiple low-power Ethernet powered devices may be affected.

SUMMARY

The present application provides a power over Ethernet method, apparatus, device, and system, so as to reduce the effect of a high-power Ethernet powered device on low-power Ethernet powered devices.

In a first aspect, the present application provides a method for an Ethernet power sourcing equipment to provide power to one or more Ethernet powered devices connected to the Ethernet power sourcing equipment, including:

setting, by a controlling apparatus, a power supply mode of the Ethernet power sourcing equipment;

determining, by the controlling apparatus, high-power Ethernet powered device(s) and low-power Ethernet powered device(s) among the Ethernet powered devices connected to the Ethernet power sourcing equipment, wherein a high-power Ethernet powered device is an Ethernet powered device whose power requirement is greater than a set value; and setting, by the controlling apparatus, a power supply priority for each of the Ethernet powered devices based on the power supply mode of the Ethernet power sourcing equipment, wherein when the power supply mode of the Ethernet power sourcing equipment is a first power supply mode, the power supply priority of a high-power Ethernet powered device is same as or lower than the lowest priority of the low-power Ethernet powered device(s).

In a first implementation manner of the first aspect, the method further includes:

when a new Ethernet powered device is connected to the Ethernet power sourcing equipment, setting, by the controlling apparatus, a power supply priority of the new Ethernet powered device according to power requirement of the new Ethernet powered device and the power supply mode of the Ethernet power sourcing equipment; and determining, by the controlling apparatus, whether the Ethernet power sourcing equipment supplies power to the new Ethernet powered device according to a maximum output power of the Ethernet power sourcing equipment, a used power of the Ethernet power sourcing equipment, the power supply priorities of the Ethernet powered devices, and the power supply priority of the new Ethernet powered device.

In a second implementation manner of the first aspect, the determining whether the Ethernet power sourcing equipment supplies power to the new Ethernet powered device includes:

determining a working state of the Ethernet power sourcing equipment according to the maximum output power of the Ethernet power sourcing equipment, a first power threshold, and the used power of the Ethernet power sourcing equipment, wherein the working state is a normal state if the used power of the Ethernet power sourcing equipment is less than or equal to the first power threshold, the working state is a high-load state if the used power of the Ethernet power sourcing equipment is greater than the first power threshold and less than or equal to the maximum output power of the Ethernet power sourcing equipment, and the working state is a overload state if the used power of the Ethernet power sourcing equipment is greater than the maximum output power of the Ethernet power sourcing equipment; and when the working state of the Ethernet power sourcing equipment is the high-load state, if the power supply priority of the new Ethernet powered device is higher than the power supply priority of at least one high-power Ethernet powered device, controlling the Ethernet power sourcing equipment to supply power to the new Ethernet powered device, and cease to supply power to the high-power Ethernet powered device.

In a third implementation manner of the first aspect, the determining whether the Ethernet power sourcing equipment supplies power to the new Ethernet powered device includes:

when the working state is the overload state, controlling the Ethernet power sourcing equipment to cease supplying power to an Ethernet powered device with a lowest power supply priority among the Ethernet powered devices, and to refuse supplying power to the new Ethernet powered device, until the Ethernet power sourcing equipment reaches the normal working state.

In a fourth implementation manner of the first aspect, the determining whether the Ethernet power sourcing equipment supplies power to the new Ethernet powered device includes:

when the working state is the normal state, controlling the Ethernet power sourcing equipment to supply power to the new Ethernet powered device.

In a fifth implementation manner of the first aspect, the method further includes:

when the power supply mode of the Ethernet power sourcing equipment is a second power supply mode, setting, by the controlling apparatus, power supply priorities of the Ethernet powered devices connected to the Ethernet power sourcing equipment according to a preset policy that is not related to power requirements of the Ethernet powered devices.

In a second aspect, the present application provides an apparatus for controlling power supply over Ethernet, including a processing hardware platform executing instructions stored on a non-transitory computer-readable storage medium to perform functions as a plurality of modules, the plurality of modules includes:

a power supply mode setting module, configured to set a power supply mode of an Ethernet power sourcing equipment;

a first determining module, configured to determine high-power Ethernet powered device(s) and low-power Ethernet powered device(s) among the Ethernet powered devices connected to the Ethernet power sourcing equipment, wherein a high-power Ethernet powered device is an Ethernet powered device whose power requirement is greater than a set value; and a power supply priority setting module, configured to set a power supply priority for each of the Ethernet powered devices based on the power supply mode of the Ethernet power sourcing equipment, wherein when the power supply mode of the Ethernet power sourcing equipment is a first power supply mode, the power supply priority of a high-power Ethernet powered device is same as or lower than the lowest priority of the low-power Ethernet powered device(s).

In a first implementation manner of the second aspect, when a new Ethernet powered device is connected to the Ethernet power sourcing equipment, the power supply priority setting module is further configured to set a power supply priority of the new Ethernet powered device according to power requirement of the new Ethernet powered device and the power supply mode of the Ethernet power sourcing equipment;

and wherein the plurality of modules further comprise:

a second determining module, configured to determine whether the Ethernet power sourcing equipment supplies power to the new Ethernet powered device according to a used power of the Ethernet power sourcing equipment, the power supply priorities of the Ethernet powered devices, the power supply priority of the new Ethernet powered device, and a maximum output power of the Ethernet power sourcing equipment.

In a second implementation manner of the second aspect, wherein in determining whether the Ethernet power sourcing equipment supplies power to the new Ethernet powered device, the second determining module is specifically configured to:

determine a working state of the Ethernet power sourcing equipment according to the maximum output power of the Ethernet power sourcing equipment, a first power threshold, and the used power of the Ethernet power sourcing equipment, wherein the working state is a normal state if the used power of the Ethernet power sourcing equipment is less than or equal to the first power threshold, the working state is a high-load state if the used power of the Ethernet power sourcing equipment is greater than the first power threshold and less than or equal to the maximum output power of the Ethernet power sourcing equipment, and the working state is a overload state if the used power of the Ethernet power sourcing equipment is greater than the maximum output power of the Ethernet power sourcing equipment;

and wherein the plurality of modules further comprise:

a power supply controlling module, configured to, when the working state of the Ethernet power sourcing equipment is the high-load state, if the power supply priority of the new Ethernet powered device is higher than the power supply priority of at least one high-power Ethernet powered device, control the Ethernet power sourcing equipment to supply power to the new Ethernet powered device, and cease to supply power to the high-power Ethernet powered device.

In a second implementation manner of the second aspect, the determining module is specifically configured to acquire a current working state of the Ethernet power sourcing equipment according to the maximum output power of the Ethernet power sourcing equipment, a first preset power threshold, and the used power of the Ethernet power sourcing equipment; and when the current working state is an overload state, determine that the Ethernet power sourcing equipment stops supplying power to an Ethernet powered device with a lowest power supply priority among Ethernet powered devices whose power is supplied by the Ethernet power sourcing equipment, and forbid supplying power again to the Ethernet powered device whose power is stopped being supplied.

In a third implementation manner of the second aspect, wherein the power supply controlling module is further configured to, when the current working state is the overload state, control the Ethernet power sourcing equipment to cease supplying power to an Ethernet powered device with a lowest power supply priority among the Ethernet powered devices, and to refuse supplying power to the new Ethernet powered device, until the Ethernet power sourcing equipment reaches the normal working state.

In a fourth implementation manner of the second aspect, wherein the power supply controlling module is further configured to, when the working state is the normal state, control the Ethernet power sourcing equipment to supply power to the new Ethernet powered device.

In a fifth implementation manner of the second aspect, wherein the power supply priority setting module is further configured to set the power supply priorities of the Ethernet powered devices according to a preset policy when the power supply mode of the Ethernet power sourcing equipment is a second power supply mode, wherein the preset policy is not related to power requirements of the Ethernet powered devices.

In a sixth implementation manner of the second aspect, wherein the apparatus is a server connected to the Ethernet power sourcing equipment or an integrated part of the Ethernet power sourcing equipment, and wherein the Ethernet power sourcing equipment is a network switch or a router that supports the power over Ethernet.

In a third aspect, the present application provides an Ethernet power sourcing equipment capable of providing power over Ethernet to one or more Ethernet powered devices, said Ethernet power sourcing equipment comprising one or more Ethernet port(s), a power supply circuit connected to the one or more Ethernet port(s), and a processor connected to the power supply circuit, wherein:

the processor is configured to:

set a power supply mode of the Ethernet power sourcing equipment;

determine high-power Ethernet powered device(s) and low-power Ethernet powered device(s) among the Ethernet powered devices connected to the one or more Ethernet port(s) respectively, wherein a high-power Ethernet powered device is an Ethernet powered device whose power requirement is greater than a set value; and set a power supply priority for each of the Ethernet powered devices, so that when the power supply mode of the Ethernet power sourcing equipment is a first power supply mode, the power supply priority of a high-power Ethernet powered device is same as or lower than the lowest priority of the low-power Ethernet powered device(s).

In a first implementation manner of the third aspect, the Ethernet power sourcing equipment further includes a power requirement testing circuit connected to the processor, wherein the power requirement testing circuit is configured to:

when a new Ethernet powered device is connected to the Ethernet power sourcing equipment, determine a power requirement of the new Ethernet powered device;

and the processor is further configured to set a power supply priority of the new Ethernet powered device according to the power requirement of the new Ethernet powered device and the power supply mode of the Ethernet power sourcing equipment, and determine whether the power supply circuit supplies power to the new Ethernet powered device according to a maximum output power of the Ethernet power sourcing equipment, a used power of the Ethernet power sourcing equipment, the power supply priorities of the Ethernet powered devices, and the power supply priority of the new Ethernet powered device.

In a second implementation manner of the third aspect, wherein in determining whether the power supply circuit supplies power to the new Ethernet powered device, the processor is configured to:

determine a working state of the Ethernet power sourcing equipment according to the maximum output power of the Ethernet power sourcing equipment, a first power threshold, and the used power of the Ethernet power sourcing equipment, wherein the working state is a normal state if the used power of the Ethernet power sourcing equipment is less than or equal to the first power threshold, the working state is a high-load state if the used power of the Ethernet power sourcing equipment is greater than the first power threshold and less than or equal to the maximum output power of the Ethernet power sourcing equipment, and the working state is a overload state if the used power of the Ethernet power sourcing equipment is greater than the maximum output power of the Ethernet power sourcing equipment; and when the working state of the Ethernet power sourcing equipment is the high-load state, if the power supply priority of the new Ethernet powered device is higher than the power supply priority of at least one high-power Ethernet powered device, control the power supply circuit to supply power to the new Ethernet powered device, and cease to supply power to the high-power Ethernet powered device.

In a third implementation manner of the third aspect, wherein in determining whether the power supply circuit supplies power to the new Ethernet powered device, the processor is configured to:

when the current working state is the overload state, control the power supply circuit to cease supplying power to an Ethernet powered device with a lowest power supply priority among the Ethernet powered devices, and to refuse supplying power to the new Ethernet powered device, until the Ethernet power sourcing equipment reaches the normal working state.

In a fourth implementation manner of the third aspect, wherein the processor is further configured to:

when the power supply mode of the Ethernet power sourcing equipment is a second power supply mode, set the power supply priorities of the Ethernet powered devices according to a preset policy, where the preset policy is not related to power requirements of the Ethernet powered devices.

In a fifth implementation manner of the third aspect, the Ethernet power sourcing equipment further includes a power supply mode switching key connected to the processor;

wherein the power supply mode switching key is configured to switch the power supply mode of the Ethernet power sourcing equipment from the first power supply mode to the second power supply mode, or switch the power supply mode of the Ethernet power sourcing equipment from the second power supply mode to the first power supply mode under instructions from the processor or in response to a user input.

In a fourth aspect, the present application provides a power over Ethernet system, including an Ethernet power sourcing equipment and one or more Ethernet powered devices connected to the Ethernet power sourcing equipment, wherein the Ethernet power sourcing equipment comprises one or more Ethernet ports for connecting to the one or more Ethernet powered devices respectively, a power supply circuit connected to the one or more Ethernet ports, and a processor connected to the power supply circuit, wherein:

the processor is configured to:

set a power supply mode of the Ethernet power sourcing equipment;

determine high-power Ethernet powered device(s) and low-power Ethernet powered device(s) among the Ethernet powered devices connected to the one or more Ethernet ports respectively, wherein a high-power Ethernet powered device is an Ethernet powered device whose power requirement is greater than a set value; and set a power supply priority for each of the Ethernet powered devices, so that when the power supply mode of the Ethernet power sourcing equipment is a first power supply mode, the power supply priority of a high-power Ethernet powered device is same as or lower than the lowest priority of the low-power Ethernet powered device(s).

In a first implementation manner of the fourth aspect, wherein the Ethernet power sourcing equipment further comprises a power requirement testing circuit which is connected to the processor, wherein when a new Ethernet powered device is connected to the Ethernet power sourcing equipment, the power requirement testing circuit is configured to determine a power requirement of the new Ethernet powered device;

and the processor is further configured to set a power supply priority of the new Ethernet powered device according to the power requirement of the new Ethernet powered device and the power supply mode of the Ethernet power sourcing equipment, and determine whether the power supply circuit supplies power to the new Ethernet powered device according to a maximum output power of the Ethernet power sourcing equipment, a used power of the Ethernet power sourcing equipment, the power supply priorities of the Ethernet powered devices, and the power supply priority of the new Ethernet powered device.

In a second implementation manner of the fourth aspect, wherein when the power supply mode of the Ethernet power sourcing equipment is a second power supply mode, the processor is configured to set the power supply priorities of the Ethernet powered devices according to a preset policy, wherein the preset policy is not related to power requirements of the Ethernet powered devices.

It can be seen from the foregoing technical solutions that, in a first power supply mode, a power supply priority of a high-power Ethernet powered device in the present application is set to a lowest priority, thereby reducing an effect of a high-power Ethernet powered device on a low-power Ethernet powered device.

BRIEF DESCRIPTION OF DRAWINGS

To describe the technical solutions in the embodiments of the present application more clearly, the following briefly introduces the accompanying drawings required for describing the embodiments. Apparently, the accompanying drawings in the following description show merely some embodiments of the application, and a person of ordinary skill in the art may still derive other drawings from these accompanying drawings without creative efforts.

DETAILED DESCRIPTION OF EMBODIMENTS

The following gives a description of a specific implementation process of the present application with reference to embodiments. Apparently, the embodiments described herein are a part rather than all of the embodiments of the present application. All other embodiments obtained by a person of ordinary skill in the art based on the embodiments of the present application without creative efforts shall fall within the protection scope of the present application.

Figure 1:
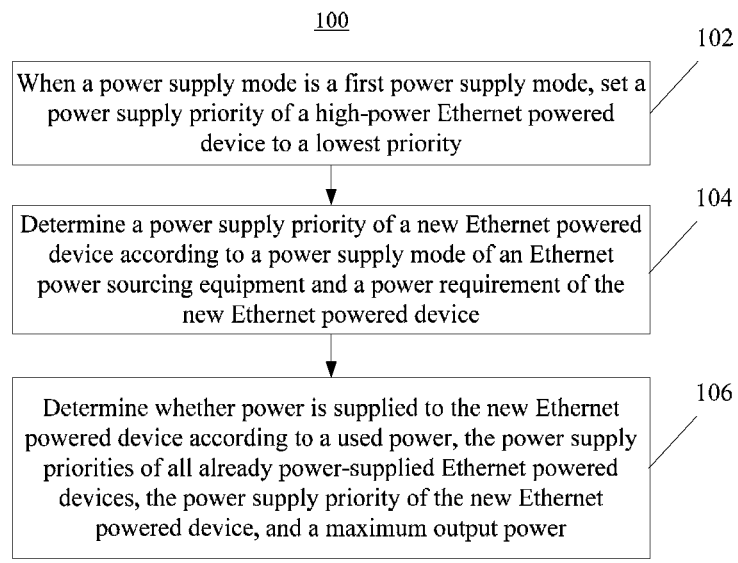
FIG. 1 is a flowchart of a power over Ethernet method according to an embodiment of the present application.

FIG. 1 is a flowchart of a power over Ethernet method 100 according to an embodiment of the present application. The method includes:

102: When a power supply mode of an Ethernet power sourcing equipment is a first power supply mode, a power over Ethernet apparatus sets a power supply priority of a high-power Ethernet powered device, whose power is supplied by the Ethernet power sourcing equipment, to a lowest priority. The high-power Ethernet powered device is an Ethernet powered device whose power requirement is greater than a set value.

104: When a new Ethernet powered device is connected to the Ethernet power sourcing equipment, the power over Ethernet apparatus determines a power supply priority of the new Ethernet powered device according to the power supply mode of the Ethernet power sourcing equipment and a power requirement of the new Ethernet powered device.

106: The power over Ethernet apparatus determines whether the Ethernet power sourcing equipment supplies power to the new Ethernet powered device according to a used power of the Ethernet power sourcing equipment, the power supply priorities of the new Ethernet powered device and already power-supplied Ethernet powered devices, and a maximum output power of the Ethernet power sourcing equipment.

The power over Ethernet apparatus may be implemented by an independent apparatus such as a server that is connected to an Ethernet power sourcing equipment; or the power over Ethernet apparatus may be integrated into an Ethernet power sourcing equipment, and the power over Ethernet apparatus is implemented by the Ethernet power sourcing equipment. The Ethernet power sourcing equipment in this embodiment of the application may specifically be a network switch or a router that supports the power over Ethernet (PoE).

An already power-supplied Ethernet powered device is an Ethernet powered device whose power is supplied by the Ethernet power sourcing equipment. An Ethernet powered device whose power is supplied by an Ethernet power sourcing equipment, refers to a device that is connected to the Ethernet power sourcing equipment through an Ethernet cable and whose power has already been supplied by the Ethernet power sourcing equipment. The Ethernet powered device in this embodiment of the application may specifically be an Internet Protocol (IP) camera, a voice over Internet Protocol (VoIP) phone, a wireless access point (AP), a network-attached storage (NAS), or a thin client that supports the power over Ethernet. The number of already power-supplied Ethernet powered devices may be one or many. In this embodiment of the application, an Ethernet powered device whose power requirement is greater than a set value, for example, 30 W, is called a high-power Ethernet powered device, and an Ethernet powered device whose power requirement is less than or equal to the set value is called a low-power Ethernet powered device.

The Ethernet power sourcing equipment may have different power supply modes, for example a first power supply mode and a second power supply mode as described below. The following first power supply mode and second power supply mode are merely example of the present application, but are not intended to limit the protection scope of the present application. Any variation or replacement readily figured out by a person skilled in the art within the technical scope disclosed in the present application shall all fall within the protection scope of the present application.

First Power Supply Mode

When the power supply mode of the Ethernet power sourcing equipment is the first power supply mode, the Ethernet power sourcing equipment preferentially supplies power to low-power Ethernet powered device(s), and supplies power to a high-power Ethernet powered device only after power supply requirements of the low-power Ethernet powered device(s) are met. In terms of power supply priority, when the power supply mode of the Ethernet power sourcing equipment is the first power supply mode, a power supply priority of the high-power Ethernet powered device is set to a lowest priority. The lowest priority refers to a priority that is a lowest one among all priorities that can be set for the Ethernet powered devices. The lowest priority may be lower than a lowest one among all priorities that can be set for low-power Ethernet powered devices, or may be the same as a lowest priority among all priorities that can be set for the low-power Ethernet powered devices.

For example, a power supply priority that can be set for a low-power Ethernet powered device is one of the following: "critical", "high", and "low". The power supply priority of a high-power Ethernet powered device may be set to an even lower level than "low", such as "very low", where a sequence of power supply priorities is "critical", "high", "low", and "very low" in a descending order.

For another example, if a power supply priority that can be set for a low-power Ethernet powered device is one of the following: "critical", "high", and "low", the power supply priority of a high-power Ethernet powered device may be set to "low", where a sequence of power supply priorities is, sequentially, "critical", "high", and "low" in a descending order. The Ethernet power sourcing equipment preferentially supplies power to an Ethernet powered device whose power supply priority is relatively high.

Second Power Supply Mode

When the power supply mode of the Ethernet power sourcing equipment is the second power supply mode, the power over Ethernet apparatus sets the power supply priority of the high-power Ethernet powered device according to a preset policy where the power supply priorities are not related to power requirements of the Ethernet powered devices.

Under the preset policy, the Ethernet power sourcing equipment supplies power without distinguishing low-power Ethernet powered devices and high-power Ethernet powered devices. The power over Ethernet apparatus sets power supply priorities of all Ethernet powered devices according to the preset policy, regardless of the power requirements of the Ethernet powered devices.

For one example, the preset policy may be that, according to a time sequence of connecting to the Ethernet power source equipment, the priority of an earlier-connected Ethernet powered device is higher than the priority of a later-connected Ethernet powered device, or vise versa.

For another example, the preset policy may be that, a power supply priority of an Ethernet powered device may be set according to a preset priority of an Ethernet port of the Ethernet power sourcing equipment to which the Ethernet powered device is connected. For instance, the Ethernet power sourcing equipment includes eight Ethernet ports from Port 1 to Port 8. According to the preset policy, the power supply priorities of Ethernet powered devices connected to Port 1, Port 4 and Port 5 are "critical". The power supply priorities of Ethernet powered devices connected to Port 2, Port 3 and Port 8 are "high". The power supply priorities of Ethernet powered devices connected to Port 6 and Port 7 are "low". For another instance, the preset policy may be that a priority of an Ethernet powered device is higher if it is connected to a smaller-numbered Ethernet port of the Ethernet power sourcing equipment.

The power supply mode of the Ethernet power sourcing equipment may be set by a user of the Ethernet power sourcing equipment. For example, if the user expects that the Ethernet power sourcing equipment preferentially supplies power to a low-power Ethernet powered device, the user may set the power supply mode of the Ethernet power sourcing equipment to the first power supply mode. If the user expects that the Ethernet power sourcing equipment supplies power only according to a policy that is not related to a power requirement, the user may set the power supply mode of the Ethernet power sourcing equipment to the second power supply mode.

The power supply mode may be set in a software manner, for example, set by using a console of the power over Ethernet apparatus, or set in a hardware manner, for example, set by using a power supply mode switching key. The power supply mode switching key is configured to switch the power supply mode of the Ethernet power sourcing equipment from the first power supply mode to the second power supply mode and switch the power supply mode of the Ethernet power sourcing equipment from the second power supply mode to the first power supply mode.

When a new Ethernet powered device is connected to the Ethernet power sourcing equipment, the power supply priority of the new Ethernet powered device is determined according to the power supply mode of the Ethernet power sourcing equipment. When the power supply mode of the Ethernet power sourcing equipment is the first power supply mode, the power supply priority of the new Ethernet powered device depends on whether it is a high-power or low-power Ethernet powered device. If the new Ethernet powered device is a high-power Ethernet powered device, the power supply priority of the new Ethernet powered device is set to the lowest priority. If the new Ethernet powered device is a low-power Ethernet powered device, the power supply priority of the new Ethernet powered device is set to a higher priority. When the power supply mode of the Ethernet power sourcing equipment is the second power supply mode, the power supply priority of the new Ethernet powered device is set according to a foregoing preset policy.

The used power of the Ethernet power sourcing equipment is a sum of powers supplied to the already power-supplied Ethernet powered devices and may be obtained through a measurement performed by the Ethernet power sourcing equipment. The Ethernet power sourcing equipment may measure a power supplied to each already power-supplied Ethernet powered device and calculate a sum of the powers supplied to all the already power-supplied Ethernet powered devices to obtain the used power of the Ethernet power sourcing equipment. The Ethernet power sourcing equipment may also directly measure a total power supplied to the already power-supplied Ethernet powered devices.

Alternatively, the Ethernet power sourcing equipment may measure an electric current supplied to each already power-supplied Ethernet powered device. After a sum of the electric currents supplied to all already power-supplied Ethernet powered devices is calculated, a voltage provided by the Ethernet power sourcing equipment to supply power to the already power-supplied Ethernet powered devices is then multiplied, so as to obtain the used power of the Ethernet power sourcing equipment.

If the power over Ethernet apparatus is implemented by an independent apparatus, the power over Ethernet apparatus acquires, from the Ethernet power sourcing equipment, the used power through measurement performed by the Ethernet power sourcing equipment. Optionally, a sum of power requirements of all already power-supplied Ethernet powered devices may be used as an approximate value of the used power of the Ethernet power sourcing equipment, and no actual measurement is performed.

The maximum output power of the Ethernet power sourcing equipment is preset and is a maximum value of a power that can be supplied by the Ethernet power sourcing equipment to Ethernet powered devices.

The Ethernet power sourcing equipment may have different working states. Specifically, a current working state of the Ethernet power sourcing equipment may be one of the following: a normal state, a high-load state, and an overload state. The current working state of the Ethernet power sourcing equipment may be determined according to parameters such as the maximum output power of the Ethernet power sourcing equipment, a first power threshold, and the used power of the Ethernet power sourcing equipment.

For example, the current working state of the Ethernet power sourcing equipment is the normal state if the used power of the Ethernet power sourcing equipment is less than or equal to the first power threshold. The current working state of the Ethernet power sourcing equipment is the high-load state if the used power of the Ethernet power sourcing equipment is greater than the first power threshold and less than or equal to the maximum output power of the Ethernet power sourcing equipment. The current working state of the Ethernet power sourcing equipment is the overload state if the used power of the Ethernet power sourcing equipment is greater than the maximum output power of the Ethernet power sourcing equipment.

The first power threshold is less than or equal to the maximum output power of the Ethernet power sourcing equipment. If the first power threshold is equal to the maximum output power of the Ethernet power sourcing equipment, the current working state of the Ethernet power sourcing equipment may only be one of the following: the normal state and the overload state.

The power over Ethernet apparatus determines based on the current working state of the Ethernet power sourcing equipment, whether the Ethernet power sourcing equipment should supply power to the new Ethernet powered device. For example, when the current working state is the normal state, it is determined that the Ethernet power sourcing equipment supplies power to the new Ethernet powered device. Alternatively, when the current working state is the normal state, and if the used power of the Ethernet power sourcing equipment plus the power requirement of the new Ethernet powered device is lower than the maximum output power of the Ethernet power sourcing equipment, the Ethernet power sourcing equipment supplies power to the new Ethernet powered device.

When the current working state of the Ethernet power sourcing equipment is the high-load state, the power over Ethernet apparatus may adjust the power supply of the Ethernet powered devices according to their power supply priorities. For example, if the power supply priority of the new Ethernet powered device is higher than that of an already power-supplied Ethernet powered device with a lowest power supply priority, the power over Ethernet apparatus determines that the Ethernet power sourcing equipment may start supplying power to the new Ethernet powered device and stop supplying power to the already power-supplied Ethernet powered device with the lowest power supply priority.

When the current working state of the Ethernet power sourcing equipment is the overload state, it is determined that the Ethernet power sourcing equipment does not supply power to the new Ethernet powered device at all. Optionally, further, when the current working state of the Ethernet power sourcing equipment is the overload state, it is determined that the Ethernet power sourcing equipment stops supplying power to an already power-supplied Ethernet powered device with a lowest power supply priority.

After stopping supplying power to the already power-supplied Ethernet powered device with the lowest power supply priority, if the current working state of the Ethernet power sourcing equipment remains the overload state, the Ethernet power sourcing equipment further stops supplying power to an already power-supplied Ethernet powered device currently with the lowest power supply priority. After stopping supplying power to the already power-supplied Ethernet powered device currently with the lowest power supply priority, if the current working state of the Ethernet power sourcing equipment changes to the normal state or the high-load state, it is determined, according to the foregoing situations in which the current working state is the normal state or the high-load state, whether the Ethernet power sourcing equipment supplies power to the new Ethernet powered device.

Optionally, further, when the current working state of the Ethernet power sourcing equipment is the overload state, after power is stopped being supplied to the already power-supplied Ethernet powered device with the lowest power supply priority, power is forbidden to be supplied again to the already power-supplied Ethernet powered device with the lowest power supply priority. The current working state of the Ethernet power sourcing equipment can be prevented from flapping in some specific implementations by using the solution of forbidding supplying power again to the already power-supplied Ethernet powered device with the lowest power supply priority. For example, the value of the first power threshold is equal to the value of the maximum output power of the Ethernet power sourcing equipment, and the current working state of the Ethernet power sourcing equipment can only be one of the following: the normal state and the overload state. Or, the value of the first power threshold approximates to the value of the maximum output power of the Ethernet power sourcing equipment, and a single Ethernet powered device may make the current working state of the Ethernet power sourcing equipment change from the normal state to the overload state.

When the current working state of the Ethernet power sourcing equipment is the normal state and if it is determined, without considering the power requirement of the new Ethernet powered device, that the Ethernet power sourcing equipment supplies power to the new Ethernet powered device, the current working state of the Ethernet power sourcing equipment may flap between the normal state and the overload state. The flapping can be prevented by forbidding supplying power again to the already power-supplied Ethernet powered device with the lowest power supply priority. Specifically, for the solution of forbidding supplying power again to the already power-supplied Ethernet powered device with the lowest power supply priority, several different implementations may exist.

For example, once it is determined that power is stopped being supplied to an Ethernet powered device, power is forbidden to be supplied again to the Ethernet powered device; or, when it is detected that the number of times that the current working state of the Ethernet power sourcing equipment changes in a preset time period exceeds a first preset value, power is forbidden to be supplied again to the Ethernet powered device with the lowest power supply priority; or, when the number of times of stopping supplying power to a same Ethernet powered device reaches a second preset value, power is forbidden to be supplied again to the Ethernet powered device.

Optionally, if the used power of the Ethernet power sourcing equipment is greater than a second power threshold, the power over Ethernet apparatus sends out an alarm. For example, an alarm in the form of sound or light is sent out, or the user of the Ethernet power sourcing equipment is alarmed in the form of a short message according to a preset mobile phone number or in the form of an email according to a preset email address. The second power threshold is greater than or equal to the first power threshold and less than or equal to the maximum output power of the Ethernet power sourcing equipment.

Ethernet powered devices that are connected to the Ethernet power sourcing equipment may not be all already power-supplied Ethernet powered devices. If the power supply mode of the Ethernet power sourcing equipment changes, an Ethernet powered device connected to the Ethernet power sourcing equipment and whose power is not supplied by the Ethernet power sourcing equipment is regarded as a new Ethernet powered device, and it is determined, according to the foregoing procedure, whether power is supplied to the Ethernet powered device.

If the number of Ethernet powered devices connected to the Ethernet power sourcing equipment and whose power are not supplied by the Ethernet power sourcing equipment is greater than 1, an Ethernet powered device with a highest power supply priority among them is regarded as a new Ethernet powered device, and it is determined, according to the foregoing procedure, whether power is supplied to these Ethernet powered devices.

For example, there are five Ethernet powered devices connected to the Ethernet power sourcing equipment, and the Ethernet power sourcing equipment supplies power to three Ethernet powered devices among them. The power supply mode of the Ethernet power sourcing equipment is the second power supply mode, as introduced above. One of the three already power-supplied Ethernet powered devices is a high-power Ethernet powered device. The power supply priority of the high-power Ethernet powered device is "critical". Two Ethernet powered devices whose power is not supplied by the Ethernet power sourcing equipment are low-power Ethernet powered devices, and power supply priorities of the two low-power Ethernet powered devices are "high" and "low", respectively. Because the current working state of the Ethernet power sourcing equipment is the high-load state, it is determined that the Ethernet power sourcing equipment does not supply power to the two low-power Ethernet powered devices.

If the power supply mode of the Ethernet power sourcing equipment changes from the second power supply mode to the first power supply mode as introduced above, the power supply priority of the high-power Ethernet powered device changes to "very low". The power supply priorities of the two low-power Ethernet powered devices whose power is not supplied by the Ethernet power sourcing equipment are still "high" and "low", respectively. The two low-power Ethernet powered devices are regarded as new Ethernet powered devices. Because the current working state of the Ethernet power sourcing equipment is the high-load state and the power supply priority of the low-power Ethernet powered device being "high" is higher than that of an already power-supplied Ethernet powered device with a lowest power supply priority, that is, the foregoing high-power Ethernet powered device, it is determined that the Ethernet power sourcing equipment may start supplying power to the low-power Ethernet powered device whose power supply priority is "high", and it is determined that the Ethernet power sourcing equipment stops supplying power to the foregoing high-power Ethernet powered device.

Because power is stopped being supplied to the foregoing high-power Ethernet powered device and the current working state of the Ethernet power sourcing equipment changes to the normal state, it is determined that the Ethernet power sourcing equipment further supplies power to the low-power Ethernet powered device whose power supply priority is "low".

After power is supplied to the low-power Ethernet powered device whose power supply priority is "low", if the current working state of the Ethernet power sourcing equipment changes to the high-load state, and because the power supply priority of the high-power Ethernet powered device is "very low" and is lower than that of the already power-supplied Ethernet powered device with the lowest power supply priority, it is determined that the Ethernet power sourcing equipment does not supply power to the high-power Ethernet powered device.

After power is supplied to the low-power Ethernet powered device whose power supply priority is "low", if the current working state of the Ethernet power sourcing equipment remains the normal state, and if the used power of the Ethernet power sourcing equipment plus a power requirement of the high-power Ethernet powered device is lower than the maximum output power of the Ethernet power sourcing equipment, it is determined that the Ethernet power sourcing equipment keeps supplying power to the high-power Ethernet powered device.

Figure 2:
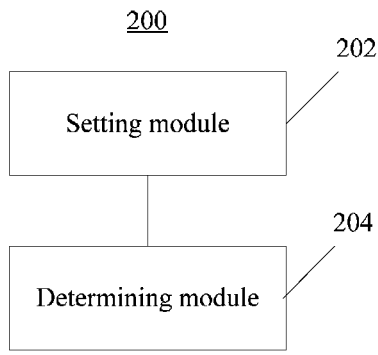
FIG. 2 is a simplified block diagram of a power over Ethernet apparatus according to an embodiment of the present application.

FIG. 2 is a simplified block diagram of a power over Ethernet apparatus according to an embodiment of the present application. The power over Ethernet apparatus 200 includes a setting module 202 and a determining module 204. The power over Ethernet apparatus 200 may be implemented by an independent apparatus such as a server that is connected to an Ethernet power sourcing equipment; or, the power over Ethernet apparatus 200 may be integrated into an Ethernet power sourcing equipment, and the power over Ethernet apparatus 200 is implemented by the Ethernet power sourcing equipment. An Ethernet power sourcing equipment in this embodiment of the application may specifically be a network switch or a router that supports power over Ethernet (PoE).

The setting module 202 is configured to, when a power supply mode of an Ethernet power sourcing equipment is a first power supply mode, set a power supply priority of a high-power Ethernet powered device whose power is supplied by the Ethernet power sourcing equipment to a lowest priority, where the high-power Ethernet powered device is an Ethernet powered device whose power requirement is greater than a set value.

The Ethernet powered device in this embodiment of the application may specifically be an IP camera, a VoIP phone, a wireless AP, a NAS, or a thin client that supports PoE.

An Ethernet powered device whose power is supplied by the Ethernet power sourcing equipment refers to a device that is connected to the Ethernet power sourcing equipment through an Ethernet cable and whose power has already been supplied by the Ethernet power sourcing equipment. The number of Ethernet powered devices whose power is supplied by the Ethernet power sourcing equipment may be one or many. In this embodiment of the application, an Ethernet powered device whose power requirement is greater than a set value, for example, 30 W, is called a high-power Ethernet powered device, and an Ethernet powered device whose power requirement is less than or equal to the set value is called a low-power Ethernet powered device.

The Ethernet power sourcing equipment may have different power supply modes, for example a first power supply mode and a second power supply mode as described below. The following first power supply mode and second power supply mode are merely example of the present application, but are not intended to limit the protection scope of the present application. Any variation or replacement readily figured out by a person skilled in the art within the technical scope disclosed in the present application shall all fall within the protection scope of the present application.

First Power Supply Mode

When the power supply mode of the Ethernet power sourcing equipment is the first power supply mode, the Ethernet power sourcing equipment preferentially supplies power to low-power Ethernet powered device(s), and supplies power to a high-power Ethernet powered device only after power supply requirements of the low-power Ethernet powered device(s) are met. In terms of power supply priority, when the power supply mode of the Ethernet power sourcing equipment is the first power supply mode, the setting module 202 sets the power supply priority of a high-power Ethernet powered device to a lowest priority. The lowest priority refers to a priority that is a lowest one among all priorities that can be set by the setting module 202 for the Ethernet powered devices. The lowest priority may be lower than a lowest one among all priorities that can be set for low-power Ethernet powered devices, or may be the same as a lowest priority among all priorities that can be set for the low-power Ethernet powered devices.

For example, a power supply priority that can be set by the setting module 202 for a low-power Ethernet powered device is one of the following: "critical", "high", and "low". The power supply priority of a high-power Ethernet powered device may be set to an even lower level than "low", such "very low", where a sequence of power supply priorities is, sequentially, "critical", "high", "low", and "very low" in a descending order.

For another example, if a power supply priority that can be set by the setting module 202 for a low-power Ethernet powered device is one of the following: "critical", "high", and "low", the power supply priority of a high-power Ethernet powered device may be set to "low", where a sequence of power supply priorities is, sequentially, "critical", "high", and "low" in a descending order. The Ethernet power sourcing equipment preferentially supplies power to an Ethernet powered device whose power supply priority is relatively high.

Second Power Supply Mode

The setting module 202 is further configured to set the power supply priority of the high-power Ethernet powered device according to a preset policy when the power supply mode of the Ethernet power sourcing equipment is the second power supply mode, where the power supply priorities are not related to power requirements of the Ethernet powered devices.

Under the preset policy, the Ethernet power sourcing equipment supplies power without distinguishing low-power Ethernet powered devices and high-power Ethernet powered devices. The setting module 202 sets power supply priorities of all Ethernet powered devices according to the preset policy, regardless of the power requirements of the Ethernet powered devices.

For one example, the preset policy may be that, according to a time sequence of connecting to the Ethernet power source equipment, a priority of an earlier-connected Ethernet powered device is higher than the priority of a later-connected Ethernet powered device t, or vise versa.

For another example, the preset policy may be that, a power supply priority of an Ethernet powered device may be set according to a preset priority of an Ethernet port of the Ethernet power sourcing equipment to which the Ethernet powered device is connected. For instance, the Ethernet power sourcing equipment includes eight Ethernet ports from Port 1 to Port 8. According to the preset policy, the power supply priorities of Ethernet powered devices connected to Port 1, Port 4, and Port 5 are "critical". The power supply priorities of Ethernet powered devices connected to Port 2, Port 3, and Port 8 are "high". The power supply priorities of Ethernet powered devices connected to Port 6 and Port 7 are "low". For another instance, the preset policy may be that a priority of an Ethernet powered device is higher if it is connected to smaller-numbered Ethernet port of the Ethernet power sourcing equipment.

The power supply mode of the Ethernet power sourcing equipment may be set by a user of the Ethernet power sourcing equipment. For example, if the user expects that the Ethernet power sourcing equipment preferentially supplies power to a low-power Ethernet powered device, the user may set the power supply mode of the Ethernet power sourcing equipment to the first power supply mode. If the user expects that the Ethernet power sourcing equipment supplies power only according to a policy that is not related to a power requirement, the user may set the power supply mode of the Ethernet power sourcing equipment to the second power supply mode.

The power supply mode may be set in a software manner, for example, set by using a console of the power over Ethernet apparatus, or set in a hardware manner, for example, set by using a power supply mode switching key. The power supply mode switching key is configured to switch the power supply mode of the Ethernet power sourcing equipment from the first power supply mode to the second power supply mode and switch the power supply mode of the Ethernet power sourcing equipment from the second power supply mode to the first power supply mode.

The setting module 202 is further configured to, when a new Ethernet powered device is connected to the Ethernet power sourcing equipment, determine a power supply priority of the new Ethernet powered device according to the power supply mode of the Ethernet power sourcing equipment and a power requirement of the new Ethernet powered device.

When the power supply mode of the Ethernet power sourcing equipment is the first power supply mode, the power supply priority of the new Ethernet powered device depends on whether it is a high-power or low-power Ethernet powered device. If the new Ethernet powered device is a high-power Ethernet powered device, the setting module 202 sets the power supply priority of the new Ethernet powered device to the lowest priority. If the new Ethernet powered device is a low-power Ethernet powered device, the setting module 202 sets the power supply priority of the new Ethernet powered device to a higher priority. When the power supply mode of the Ethernet power sourcing equipment is the second power supply mode, the setting module 202 sets the power supply priority of the new Ethernet powered device according to foregoing preset policy.

The determining module 204 is configured to determine, according to a used power of the Ethernet power sourcing equipment, the power supply priorities of the new Ethernet powered device and already power-supplied Ethernet powered devices, and a maximum output power of the Ethernet power sourcing equipment, whether the Ethernet power sourcing equipment supplies power to the new Ethernet powered device.

The used power of the Ethernet power sourcing equipment is a sum of powers supplied to the already power-supplied Ethernet powered devices and may be obtained through measurement performed by the Ethernet power sourcing equipment. The Ethernet power sourcing equipment may measure a power supplied to each already power-supplied Ethernet powered device and calculate a sum of the powers supplied to all the already power-supplied Ethernet powered devices to obtain the used power of the Ethernet power sourcing equipment. The Ethernet power sourcing equipment may also directly measure a total power supplied to the already power-supplied Ethernet powered devices.

The Ethernet power sourcing equipment may also measure an electric current supplied to each already power-supplied Ethernet powered device. After a sum of the electric currents supplied to all already power-supplied Ethernet powered devices is calculated, a voltage provided by the Ethernet power sourcing equipment to supply power to the already power-supplied Ethernet powered devices is then multiplied, so as to obtain the used power of the Ethernet power sourcing equipment.

If the power over Ethernet apparatus is implemented by an independent apparatus, the determining module 204 acquires, from the Ethernet power sourcing equipment, the used power through measurement performed by the Ethernet power sourcing equipment. Optionally, the determining module 204 may use a sum of power requirements of all already power-supplied Ethernet powered devices as an approximate value of the used power of the Ethernet power sourcing equipment, and no actual measurement is performed.

The maximum output power of the Ethernet power sourcing equipment is preset and is a maximum value of a power that can be supplied by the Ethernet power sourcing equipment to the Ethernet powered devices.

The Ethernet power sourcing equipment may have different working states. Specifically, a current working state of the Ethernet power sourcing equipment may be one of the following: a normal state, a high-load state, and an overload state. The determining module 204 may determine the current working state of the Ethernet power sourcing equipment according to parameters such as the maximum output power of the Ethernet power sourcing equipment, a first power threshold, and the used power of the Ethernet power sourcing equipment.

For example, the current working state of the Ethernet power sourcing equipment is the normal state if the used power of the Ethernet power sourcing equipment is less than or equal to the first power threshold. The current working state of the Ethernet power sourcing equipment is the high-load state if the used power of the Ethernet power sourcing equipment is greater than the first power threshold and less than or equal to the maximum output power of the Ethernet power sourcing equipment. The current working state of the Ethernet power sourcing equipment is the overload state if the used power of the Ethernet power sourcing equipment is greater than the maximum output power of the Ethernet power sourcing equipment.

The first power threshold is less than or equal to the maximum output power of the Ethernet power sourcing equipment. If the first power threshold is equal to the maximum output power of the Ethernet power sourcing equipment, the current working state of the Ethernet power sourcing equipment may only be one of the following: the normal state and the overload state.

The power over Ethernet apparatus 200 determines based on the current working state of the Ethernet power sourcing equipment, whether the Ethernet power sourcing equipment should supply power to the new Ethernet powered device. For example, when the current working state is the normal state, the determining module 204 determines that the Ethernet power sourcing equipment supplies power to the new Ethernet powered device. Alternatively, when the current working state is the normal state, and if the used power of the Ethernet power sourcing equipment plus the power requirement of the new Ethernet powered device is lower than the maximum output power of the Ethernet power sourcing equipment, the determining module 204 determines that the Ethernet power sourcing equipment supplies power to the new Ethernet powered device.

When the current working state of the Ethernet power sourcing equipment is the high-load state, the power over Ethernet apparatus 200 may adjust the power supply of the Ethernet powered devices according to their power supply priorities. For example, if the power supply priority of the new Ethernet powered device is higher than that of an already power-supplied Ethernet powered device with a lowest power supply priority, the determining module 204 determines that the Ethernet power sourcing equipment may start supplying power to the new Ethernet powered device and stop supplying power to the already power-supplied Ethernet powered device with the lowest power supply priority.

When the current working state of the Ethernet power sourcing equipment is the overload state, the determining module 204 determines that the Ethernet power sourcing equipment does not supply power to the new Ethernet powered device at all. Optionally, further, when the current working state of the Ethernet power sourcing equipment is the overload state, the determining module 204 determines that the Ethernet power sourcing equipment stops supplying power to an already power-supplied Ethernet powered device with a lowest power supply priority among the Ethernet powered devices whose power is supplied by the Ethernet power sourcing equipment.

After stopping supplying power to the already power-supplied Ethernet powered device with the lowest power supply priority, if the current working state of the Ethernet power sourcing equipment remains the overload state, the determining module 204 determines that the Ethernet power sourcing equipment further stops supplying power to an already power-supplied Ethernet powered device currently with the lowest power supply priority.

After stopping supplying power to the already power-supplied Ethernet powered device currently with the lowest power supply priority, if the current working state of the Ethernet power sourcing equipment changes to the normal state or the high-load state, the determining module 204 determines, according to the foregoing situations in which the current working state is the normal state or the high-load state, whether the Ethernet power sourcing equipment supplies power to the new Ethernet powered device.

Optionally, further, when the current working state of the Ethernet power sourcing equipment is the overload state, after the determining module 204 determines that power is stopped being supplied to the already power-supplied Ethernet powered device with the lowest power, power is forbidden to be supplied again to the already power-supplied Ethernet powered device with the lowest power supply priority. The current working state of the Ethernet power sourcing equipment can be prevented from flapping in some specific implementations by using the solution of forbidding supplying power again to the already power-supplied Ethernet powered device with the lowest power supply priority. For example, the value of the first power threshold is equal to the value of the maximum output power of the Ethernet power sourcing equipment, and the current working state of the Ethernet power sourcing equipment may only be one of the following: the normal state and the overload state. Or, the value of the first power threshold approximates to the value of the maximum output power of the Ethernet power sourcing equipment, and a single Ethernet powered device may make the current working state of the Ethernet power sourcing equipment change from the normal state to the overload state.

When the current working state of the Ethernet power sourcing equipment is the normal state and if it is determined, without considering the power requirement of the new Ethernet powered device, that the Ethernet power sourcing equipment supplies power to the new Ethernet powered device, the current working state of the Ethernet power sourcing equipment may flap between the normal state and the overload state. The flapping can be prevented by forbidding supplying power again to the already power-supplied Ethernet powered device with the lowest power supply priority. Specifically, for the solution of forbidding supplying power again to the already power-supplied Ethernet powered device with the lowest power supply priority, several different implementations may exist.

For example, once the determining module 204 determines that power is stopped being supplied to an Ethernet powered device, power is forbidden to be supplied again to the Ethernet powered device; or, when the determining module 204 detects that the number of times that the current working state of the Ethernet power sourcing equipment changes in a preset time period exceeds a first preset value, power is forbidden to be supplied again to the Ethernet powered device with the lowest power supply priority; or, when the number of times of stopping supplying power to a same Ethernet powered device reaches a second preset value, the determining module 204 determines that power is forbidden to be supplied again to the Ethernet powered device.

Optionally, if the used power of the Ethernet power sourcing equipment is greater than a second power threshold, the determining module 204 sends out an alarm. For example, an alarm in the form of sound or light is sent out, or the user of the Ethernet power sourcing equipment is alarmed in the form of a short message according to a preset mobile phone number or in the form of an email according to a preset email address. The second power threshold is greater than or equal to the first power threshold and less than or equal to the maximum output power of the Ethernet power sourcing equipment.

Ethernet powered devices that are connected to the Ethernet power sourcing equipment may not be all already power-supplied Ethernet powered devices. If the power supply mode of the Ethernet power sourcing equipment changes, the determining module 204 regards an Ethernet powered device that is among the Ethernet powered devices connected to the Ethernet power sourcing equipment and whose power is not supplied by the Ethernet power sourcing equipment as a new Ethernet powered device, and determines, according to the foregoing procedure, whether power is supplied to the Ethernet powered device.

If the number of Ethernet powered devices that are among the Ethernet powered devices connected to the Ethernet power sourcing equipment and whose power is not supplied by the Ethernet power sourcing equipment is greater than 1, the determining module 204 regards an Ethernet powered device with a highest power supply priority among them as a new Ethernet powered device and determines, according to the foregoing procedure, whether power is supplied to these Ethernet powered devices.

For example, there are five Ethernet powered devices connected to the Ethernet power sourcing equipment, and the Ethernet power sourcing equipment supplies power to three Ethernet powered devices among them. The power supply mode of the Ethernet power sourcing equipment is the second power supply mode, as introduced above. One of the three already power-supplied Ethernet powered devices is a high-power Ethernet powered device. The power supply priority of the high-power Ethernet powered device is "critical". Two Ethernet powered devices whose power is not supplied by the Ethernet power sourcing equipment are low-power Ethernet powered devices, and power supply priorities of the two low-power Ethernet powered devices are "high" and "low", respectively. Because the current working state of the Ethernet power sourcing equipment is the high-load state, it is determined that the Ethernet power sourcing equipment does not supply power to the two low-power Ethernet powered devices.

If the power supply mode of the Ethernet power sourcing equipment changes from the second power supply mode to the first power supply mode as introduced above, the power supply priority of the high-power Ethernet powered device changes to "very low". The power supply priorities of the two low-power Ethernet powered devices whose power is not supplied by the Ethernet power sourcing equipment are still "high" and "low", respectively. The two low-power Ethernet powered devices are regarded as new Ethernet powered devices. Because the current working state of the Ethernet power sourcing equipment is the high-load state and the power supply priority of the low-power Ethernet powered device being "high" is higher than that of an already power-supplied Ethernet powered device with a lowest power supply priority, that is, the foregoing high-power Ethernet powered device, the determining module 204 determines that the Ethernet power sourcing equipment may start supplying power to the low-power Ethernet powered device whose power supply priority is "high", and stop supplying power to the foregoing high-power Ethernet powered device.

Because power is stopped being supplied to the foregoing high-power Ethernet powered device and the current working state of the Ethernet power sourcing equipment changes to the normal state, the determining module 204 determines that the Ethernet power sourcing equipment further supplies power to the low-power Ethernet powered device whose power supply priority is "low".

After power is supplied to the low-power Ethernet powered device whose power supply priority is "low", if the current working state of the Ethernet power sourcing equipment changes to the high-load state, and because the power supply priority of the high-power Ethernet powered device is "very low" and is lower than that of the already power-supplied Ethernet powered device with the lowest power supply priority, the determining module 204 determines that the Ethernet power sourcing equipment does not supply power to the high-power Ethernet powered device.

After power is supplied to the low-power Ethernet powered device whose power supply priority is "low", if the current working state of the Ethernet power sourcing equipment remains the normal state, and if the used power of the Ethernet power sourcing equipment plus a power requirement of the high-power Ethernet powered device is lower than the maximum output power of the Ethernet power sourcing equipment, the determining module 204 determines that the Ethernet power sourcing equipment keeps supplying power to the high-power Ethernet powered device.

Figure 3:
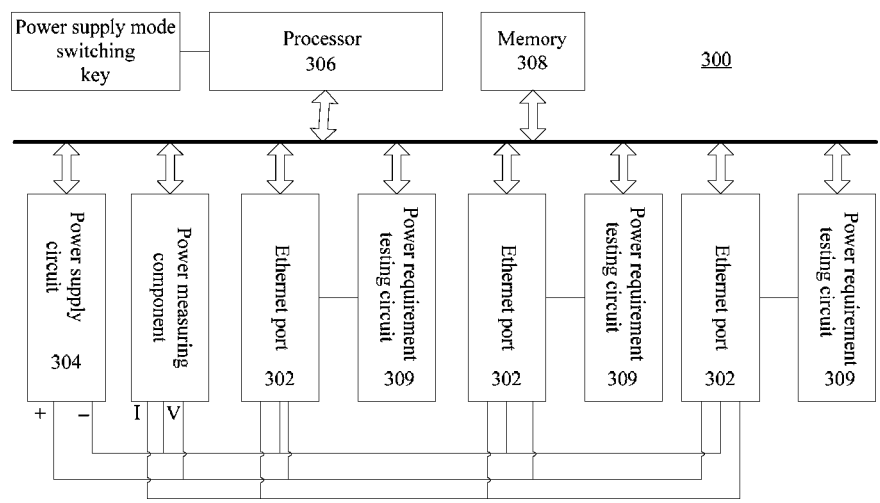
FIG. 3 is a simplified block diagram of an Ethernet power sourcing equipment according to an embodiment of the present application.

FIG. 3 is a simplified block diagram of an Ethernet power sourcing equipment 300 according to an embodiment of the present application. The Ethernet power sourcing equipment 300 includes one or more Ethernet ports 302, a power supply circuit 304, and a processor 306. An Ethernet power sourcing equipment in this embodiment of the present application may specifically be a network switch or a router that supports PoE.

The power supply circuit 304 is connected to the one or more Ethernet ports 302 and the processor 306. The bold line in FIG. 3 is a bus.

An Ethernet powered device (not shown) is connected to the Ethernet power sourcing equipment 300 through one Ethernet port 302. The Ethernet powered device and the Ethernet power sourcing equipment form a power over Ethernet system.

The processor 306 may be an application-specific integrated circuit (ASIC), a field-programmable gate array (FPGA), a complex programmable logic device (CPLD), a central processing unit (CPU), or a network processor (NP). The processor 306 performs the following operations.

When the processor 306 is a CPU or an NP, the Ethernet power sourcing equipment 300 further includes a memory 308. The memory 308 may be a volatile memory such as a random-access memory (RAM) or a non-volatile memory, for example, a read-only memory (ROM), a flash memory, a hard disk drive (HDD), or a solid-state drive (SSD). The processor 306 is connected to the memory 308. The processor 306 performs the following operations according to a program instruction stored in the memory 308.

The Ethernet power sourcing equipment 300 acquires, through a PoE classification, a power requirement of the Ethernet powered device that is connected to the Ethernet power sourcing equipment 300 through the Ethernet port 302. Specifically, if the power requirement of the Ethernet powered device is determined according to a data link layer classification, the PoE classification may be obtained by the processor 306. Optionally, the Ethernet power sourcing equipment 300 may further include one or more power requirement testing circuits 309. A power requirement testing circuit 309 is connected to its respective Ethernet port 302 and further to the processor 306 through the bus. The power requirement testing circuit 309 determines, through the PoE classification such as a physical layer classification or a data link layer classification, the power requirement of the Ethernet powered device that is connected to the Ethernet power sourcing equipment 300 through the Ethernet port 302. The power requirement testing circuit 309 notifies the processor 306 of the power requirement of the Ethernet powered device. The physical layer classification is that the power requirement testing circuit 309 adds a classification voltage to the Ethernet port 302 and measures a classification current, so as to determine the power requirement of the Ethernet powered device. The data link layer classification is that after a data link is established, the Ethernet power sourcing equipment 300 communicates with the Ethernet powered device by using a data link layer protocol, so as to determine the power requirement of the Ethernet powered device.

The Ethernet power sourcing equipment 300 may have different power supply modes, for example a first power supply mode and a second power supply mode as described below.

First Power Supply Mode

When a power supply mode of the Ethernet power sourcing equipment 300 is a first power supply mode, the processor 306 sets a power supply priority of a high-power Ethernet powered device whose power is supplied by the Ethernet power sourcing equipment to a lowest priority, where the high-power Ethernet powered device is an Ethernet powered device whose power requirement is greater than a set value.

In this embodiment of the present application, the Ethernet powered device may specifically be an IP camera, a VoIP phone, a wireless AP, a NAS, or a thin client that supports PoE. An Ethernet powered device whose power requirement is greater than a set value, for example, 30 W, is called a high-power Ethernet powered device, and an Ethernet powered device whose power requirement is less than or equal to the set value is called a low-power Ethernet powered device.

An Ethernet powered device whose power is supplied by the Ethernet power sourcing equipment refers to a device that is connected to the Ethernet power sourcing equipment 300 through an Ethernet cable and an Ethernet port 302 and whose power has already been supplied by the Ethernet power sourcing equipment 300. The number of Ethernet powered devices whose power is supplied by the Ethernet power sourcing equipment 300 may be one or many.

When the power supply mode of the Ethernet power sourcing equipment 300 is the first power supply mode, the Ethernet power sourcing equipment preferentially supplies power to low-power Ethernet powered device(s), and supplies power to a high-power Ethernet powered device only after power supply requirements of the low-power Ethernet powered device(s) are met. In terms of power supply priority, when the power supply mode of the Ethernet power sourcing equipment is the first power supply mode, the processor 306 sets a power supply priority of the high-power Ethernet powered device to a lowest priority. The lowest priority refers to a priority that is a lowest one among all priorities that can be set for the Ethernet powered devices. The lowest priority may be lower than a lowest one among all priorities that can be set for low-power Ethernet powered devices, or may be the same as a lowest priority among all priorities that can be set for the low-power Ethernet powered devices.

For example, a power supply priority that can be set for a low-power Ethernet powered device is one of the following: "critical", "high", and "low". The power supply priority of a high-power Ethernet powered device may be set to an even lower level than "low", such as "very low", where a sequence of power supply priorities is, sequentially, "critical", "high", "low", and "very low" in a descending order. For another example, if a power supply priority that can be set for a low-power Ethernet powered device is one of the following: "critical", "high", and "low", the power supply priority of a high-power Ethernet powered device may be set to "low", where a sequence of power supply priorities is, sequentially, "critical", "high", and "low" in a descending order. The Ethernet power sourcing equipment preferentially supplies power to an Ethernet powered device whose power supply priority is relatively high.

Second Power Supply Mode

When the power supply mode of the Ethernet power sourcing equipment is the second power supply mode, the processor 306 sets the power supply priority of the high-power Ethernet powered device according to a preset policy, where the preset policy are not related to power requirements of Ethernet powered devices.

Under the preset policy, the Ethernet power sourcing equipment supplies power without distinguishing low-power Ethernet powered devices and high-power Ethernet powered devices. The processor 306 sets power supply priorities of all Ethernet powered devices according to the preset policy regardless of the power requirements of the Ethernet powered devices.

For one example, the preset policy may be that, according to a time sequence of connecting to the Ethernet power source equipment, the priority of an earlier-connected Ethernet powered device is higher than the priority of a later-connected Ethernet powered device, or vise versa.

For another example, the processor 306 may set the power supply priority of the Ethernet powered device according to a preset priority of the Ethernet port 302 of the Ethernet power sourcing equipment to which the Ethernet powered device is connected. For instance, the Ethernet power sourcing equipment 300 includes eight Ethernet ports 302 from Port 1 to Port 8. According to the preset policy, the power supply priorities of Ethernet powered devices connected to Port 1, Port 4, and Port 5 are "critical". The power supply priorities of Ethernet powered devices connected to Port 2, Port 3, and Port 8 are "high". The power supply priorities of Ethernet powered devices connected to Port 6 and Port 7 are "low". For another instance, the preset policy may be that a priority of an Ethernet powered device is higher if it is connected to a smaller-numbered Ethernet port 302 of the Ethernet power sourcing equipment 300.

The power supply mode of the Ethernet power sourcing equipment 300 may be set by a user of the Ethernet power sourcing equipment. For example, if the user expects that the Ethernet power sourcing equipment preferentially supplies power to a low-power Ethernet powered device, the power supply mode of the Ethernet power sourcing equipment is set to the first power supply mode. If the user expects that the Ethernet power sourcing equipment supplies power only according to a policy that is not related to a power requirement, the power supply mode of the Ethernet power sourcing equipment is set to the second power supply mode.

The power supply mode may be set in a software manner; for example, the user of the Ethernet power sourcing equipment sets the power supply mode by using a software interface, such as a console, so that the processor 306 can acquire the power supply mode of the Ethernet power sourcing equipment. The power supply mode may also be set in a hardware manner, for example, set by using a power supply mode switching key. When the power supply mode is set by using a power supply mode switching key, the Ethernet power sourcing equipment further includes the power supply mode switching key. The power supply mode switching key is connected to the processor. The power supply mode switching key may be disposed on a panel of the Ethernet power sourcing equipment, and its specific physical form may be a button or a switch.

The power supply mode switching key is configured to switch the power supply mode of the Ethernet power sourcing equipment from the first power supply mode to the second power supply mode and switch the power supply mode of the Ethernet power sourcing equipment from the second power supply mode to the first power supply mode. The power supply mode switching key may be connected to a first pin of the processor 306. The power supply mode switching key outputs a different level when the Ethernet power sourcing equipment is in a different power supply mode. For example, when the power supply mode is the first power supply mode, the power supply mode switching key outputs a high level; and when the power supply mode is the second power supply mode, the power supply mode switching key outputs a low level.

The processor 306 determines a current power supply mode of the Ethernet power sourcing equipment 300 according to a level of the first pin. In FIG. 3, that the power supply mode is set by using the power supply mode switching key 310 and the power supply mode switching key 310 is connected to the first pin of the processor 306 is used as an example for description. The power supply mode switching key 310 may also be connected to the processor 306 through a bus. When the power supply mode of the Ethernet power sourcing equipment changes, the power supply mode switching key 310 outputs a preset code and the processor 306 determines a current mode of the Ethernet power sourcing equipment 300 according to the received code.

When a new Ethernet powered device is connected to the Ethernet power sourcing equipment 300 through an Ethernet port 302, the power requirement testing circuit 309 determines a power requirement of the new Ethernet powered device.

The processor 306 determines a power supply priority of the new Ethernet powered device according to the power supply mode of the Ethernet power sourcing equipment 300 and the power requirement of the new Ethernet powered device.

When the power supply mode of the Ethernet power sourcing equipment is the first power supply mode, the power supply priority of the new Ethernet powered device depends on whether it is a high-power or low-power Ethernet powered device. If the new Ethernet powered device is a high-power Ethernet powered device, the processor 306 sets the power supply priority of the new Ethernet powered device to the lowest priority. If the new Ethernet powered device is a low-power Ethernet powered device, the processor 306 sets the power supply priority of the new Ethernet powered device to a higher priority. When the power supply mode of the Ethernet power sourcing equipment is the second power supply mode, the processor 306 sets the power supply priority of the new Ethernet powered device according to a foregoing preset policy.

The processor 306 determines, according to a used power of the Ethernet power sourcing equipment, power supply priorities of the new Ethernet powered device and already power-supplied Ethernet powered devices, and a maximum output power of the Ethernet power sourcing equipment, whether the power supply circuit 304 supplies power to the new Ethernet powered device. An already power-supplied Ethernet powered device is a foregoing Ethernet powered device whose power is supplied by the Ethernet power sourcing equipment.

A sum of power requirements of all already power-supplied Ethernet powered devices may be used as an approximate value of the used power of the Ethernet power sourcing equipment, and no actual measurement is performed. Optionally, the used power of the Ethernet power sourcing equipment is a sum of powers supplied to the already power-supplied Ethernet powered devices and may be obtained through a measurement performed by the Ethernet power sourcing equipment.

When the used power of the Ethernet power sourcing equipment is obtained through measurement, the Ethernet power sourcing equipment further includes a power measuring component, where the power measuring component is connected to the processor 306 through the bus. In a first implementation manner, the power measuring component may be connected to each Ethernet port 302, and the power measuring component measures a first power supplied by each Ethernet port 302. Specifically, the power measuring component measures a first electric current passing through an Ethernet port 302 and a first voltage provided by the Ethernet port 302, and a first power that is supplied by the Ethernet port 302 is obtained according to the first electric current and the first voltage. A sum of the first powers that are supplied by all Ethernet ports 302 is calculated to obtain the used power of the Ethernet power sourcing equipment. In a second implementation manner, the power measuring component may measure a second power that is supplied by the power supply circuit 304. Specifically, the power measuring component measures a second electric current output by the power supply circuit 304 and a second voltage output by the power supply circuit 304, obtains, according to the second electric current and the second voltage, the second power that is supplied by the power supply circuit 304, and uses the second power as the used power of the Ethernet power sourcing equipment. In a third implementation manner, the power measuring component may measure a third electric current passing through each Ethernet port 302 and measure a third voltage output by the power supply circuit 304. After a sum of the third electric currents passing through all Ethernet ports 302 is calculated, the third voltage output by the power supply circuit 304 is then multiplied, so as to obtain the used power of the Ethernet power sourcing equipment. In FIG. 3, only the last implementation manner is used as an example to draw the block diagram, and in FIG. 3, "+" and "−" indicate positive polarity and negative polarity, respectively, "V" indicates an end for measuring a voltage, "I" indicates an end for measuring an electric current.

The maximum output power of the Ethernet power sourcing equipment is preset and is a maximum value of a power that can be supplied by Ethernet power sourcing equipment to Ethernet powered devices.

The Ethernet power sourcing equipment 300 may have different working states. Specifically, a current working state of the Ethernet power sourcing equipment may be one of the following: a normal state, a high-load state, and an overload state. The processor 306 may determine the current working state of the Ethernet power sourcing equipment, according to parameters such as the maximum output power of the Ethernet power sourcing equipment, a first power threshold, and the used power of the Ethernet power sourcing equipment.

For example, the current working state of the Ethernet power sourcing equipment is the normal state if the used power of the Ethernet power sourcing equipment is less than or equal to the first power threshold. The current working state of the Ethernet power sourcing equipment is the high-load state if the used power of the Ethernet power sourcing equipment is greater than the first power threshold and less than or equal to the maximum output power of the Ethernet power sourcing equipment. The current working state of the Ethernet power sourcing equipment is the overload state if the used power of the Ethernet power sourcing equipment is greater than the maximum output power of the Ethernet power sourcing equipment.

The first power threshold is less than or equal to the maximum output power of the Ethernet power sourcing equipment. If the first power threshold is equal to the value of the maximum output power of the Ethernet power sourcing equipment, the current working state of the Ethernet power sourcing equipment may only be one of the following: the normal state and the overload state.

The processor 306 determines, based on the current working state of the Ethernet power sourcing equipment, whether the Ethernet power sourcing equipment 300 should supply power to the new Ethernet powered device. For example, when the current working state is the normal state, the processor 306 determines that the power supply circuit 304 supplies power to the new Ethernet powered device. Specifically, the power supply circuit 304 supplies power to the new Ethernet powered device, through the Ethernet port 302. Alternatively, when the current working state is the normal state, and if the used power of the Ethernet power sourcing equipment plus the power requirement of the new Ethernet powered device is lower than the maximum output power of the Ethernet power sourcing equipment, the processor 306 determines that the power supply circuit 304 supplies power to the new Ethernet powered device.

When the current working state of the Ethernet power sourcing equipment is the high-load state, the processor 306 may adjust the power supply of the Ethernet powered devices according to their power supply priorities. For example, if the power supply priority of the new Ethernet powered device is higher than that of an already power-supplied Ethernet powered device with a lowest power supply priority, the processor 306 determines that the power supply circuit 304 starts supplying power to the new Ethernet powered device through the Ethernet port 302, and stops supplying power to the already power-supplied Ethernet powered device with the lowest power supply priority.

When the current working state of the Ethernet power sourcing equipment is the overload state, the processor 306 determines that the power supply circuit 304 does not supply power to the new Ethernet powered device at all. Optionally, further, when the current working state of the Ethernet power sourcing equipment is the overload state, the processor 306 determines that the power supply circuit 304 stops supplying power to an already power-supplied Ethernet powered device with a lowest power supply priority.

After stopping supplying power to the already power-supplied Ethernet powered device with the lowest power supply priority, if the current working state of the Ethernet power sourcing equipment remains the overload state, the processor 306 determines that the Ethernet power sourcing equipment further stops supplying power to an already power-supplied current Ethernet powered device currently with the lowest power supply priority.

After the power supply circuit 304 stops supplying power to the already power-supplied Ethernet powered device currently with the lowest power supply priority, if the current working state of the Ethernet power sourcing equipment changes to the normal state or the high-load state, the processor 306 determines, according to the foregoing situations in which the current working state is the normal state or the high-load state, whether the Ethernet power sourcing equipment supplies power to the new Ethernet powered device.

Optionally, further, when the current working state of the Ethernet power sourcing equipment is the overload state, after the power supply circuit 304 stops supplying power to the already power-supplied Ethernet powered device with the lowest power supply priority, the processor 306 forbids the power supply circuit 304 supplying power again to the already power-supplied Ethernet powered device with the lowest power supply priority.

The current working state of the Ethernet power sourcing equipment can be prevented from flapping in some specific implementations by using the solution of forbidding supplying power again to the already power-supplied Ethernet powered device with the lowest power supply priority. For example, the value of the first power threshold is equal to the value of the maximum output power of the Ethernet power sourcing equipment, and the current working state of the Ethernet power sourcing equipment may only be one of the following: the normal state and the overload state. Or, the value of the first power threshold approximates to the value of the maximum output power of the Ethernet power sourcing equipment, and a single Ethernet powered device may make the current working state of the Ethernet power sourcing equipment change from the normal state to the overload state.

When the current working state of the Ethernet power sourcing equipment is the normal state and if it is determined, without considering the power requirement of the new Ethernet powered device, that the Ethernet power sourcing equipment supplies power to the new Ethernet powered device, the current working state of the Ethernet power sourcing equipment may flap between the normal state and the overload state. The flapping can be prevented by forbidding supplying power again to the already power-supplied Ethernet powered device with the lowest power supply priority. Specifically, for the solution of forbidding supplying power again to the already power-supplied Ethernet powered device with the lowest power supply priority, several different implementations may exist.

For example, once the processor 306 determines that power is stopped being supplied to an Ethernet powered device, the power supply circuit 304 is forbidden to supply power again to the Ethernet powered device; or, when the processor 306 detects that the number of times that the current working state of the Ethernet power sourcing equipment changes in a preset time period exceeds a first preset value, the power supply circuit 304 is forbidden to supply power again to the Ethernet powered device with the lowest power supply priority; or, when the number of times that the power supply circuit 304 stops supplying power to a same Ethernet powered device reaches a second preset value, the processor 306 forbids the power supply circuit 304 to supply power again to the Ethernet powered device.

The forbidding the power supply circuit 304 to supply power again to the Ethernet powered device may be specifically that the processor 306 no longer sends, to the power supply circuit 304, an instruction of supplying power to the forbidden Ethernet powered device, or may be specifically that the processor 306 sends, to the power supply circuit 304, an instruction for forbidding supplying power to the Ethernet powered device.

Optionally, if the used power of the Ethernet power sourcing equipment is greater than a second power threshold, the processor 306 sends out an alarm. For example, the processor 306 instructs a loudspeaker of the Ethernet power sourcing equipment to send out an alarm in the form of sound, or the processor 306 instructs an indicator or a display of the Ethernet power sourcing equipment to send out an alarm in the form of light, or the processor 306 alarms a user of the Ethernet power sourcing equipment in the form of a short message according to a preset mobile phone number or in the form of an email according to a preset email address. The second power threshold is greater than or equal to the first power threshold and less than or equal to the maximum output power of the Ethernet power sourcing equipment.

Ethernet powered devices that are connected to the Ethernet power sourcing equipment may not be all already power-supplied Ethernet powered devices. If the power supply mode of the Ethernet power sourcing equipment changes, an Ethernet powered device connected to the Ethernet power sourcing equipment and whose power is not supplied by the Ethernet power sourcing equipment is regarded as a new Ethernet powered device, and it is determined, according to the foregoing procedure, whether power is supplied to the Ethernet powered device. If the number of Ethernet powered devices connected to the Ethernet power sourcing equipment and whose power are not supplied by the Ethernet power sourcing equipment is greater than 1, an Ethernet powered device with a highest power supply priority among them is regarded as a new Ethernet powered device, and it is determined, according to the foregoing procedure, whether power is supplied to these Ethernet powered devices.

For example, there are five Ethernet powered devices connected to the Ethernet power sourcing equipment, and the Ethernet power sourcing equipment supplies power to three Ethernet powered devices among them. The power supply mode of the Ethernet power sourcing equipment is the second power supply mode, as introduced above. One of the three already power-supplied Ethernet powered devices is a high-power Ethernet powered device. The power supply priority of the high-power Ethernet powered device is "critical". Two Ethernet powered devices whose power is not supplied by the Ethernet power sourcing equipment are low-power Ethernet powered devices, and power supply priorities of the two low-power Ethernet powered devices are "high" and "low", respectively. Because the current working state of the Ethernet power sourcing equipment is the high-load state, it is determined that the Ethernet power sourcing equipment does not supply power to the two low-power Ethernet powered devices.

If the power supply mode of the Ethernet power sourcing equipment changes from the second power supply mode to the first power supply mode as introduced above, the power supply priority of the high-power Ethernet powered device changes to "very low". The power supply priorities of the two low-power Ethernet powered devices whose power is not supplied by the Ethernet power sourcing equipment are still "high" and "low", respectively. The two low-power Ethernet powered devices are regarded as new Ethernet powered devices. Because the current working state of the Ethernet power sourcing equipment is the high-load state and the power supply priority of the low-power Ethernet powered device being "high" is higher than that of an already power-supplied Ethernet powered device with a lowest power supply priority, that is, the foregoing high-power Ethernet powered device, it is determined that the Ethernet power sourcing equipment may start supplying power to the low-power Ethernet powered device whose power supply priority is "high", and it is determined that the Ethernet power sourcing equipment stops supplying power to the foregoing high-power Ethernet powered device.

Because power is stopped being supplied to the foregoing high-power Ethernet powered device and the current working state of the Ethernet power sourcing equipment changes to the normal state, it is determined that the Ethernet power sourcing equipment further supplies power to the low-power Ethernet powered device whose power supply priority is "low".

After power is supplied to the low-power Ethernet powered device whose power supply priority is "low", if the current working state of the Ethernet power sourcing equipment changes to the high-load state, and because the power supply priority of the high-power Ethernet powered device is "very low" and is lower than that of the already power-supplied Ethernet powered device with the lowest power supply priority, it is determined that the Ethernet power sourcing equipment does not supply power to the high-power Ethernet powered device.

After power is supplied to the low-power Ethernet powered device whose power supply priority is "low", if the current working state of the Ethernet power sourcing equipment remains the normal state, and if the used power of the Ethernet power sourcing equipment plus a power requirement of the high-power Ethernet powered device is lower than the maximum output power of the Ethernet power sourcing equipment, it is determined that the Ethernet power sourcing equipment keeps supplying power to the high-power Ethernet powered device.

A person of ordinary skill in the art may understand that all or a part of the steps in the foregoing method embodiments may be implemented by a program instructing relevant hardware. The corresponding program may be stored in a computer readable storage medium. The foregoing storage medium may be a random-access memory, a read-only memory, a flash memory, a hard disk drive, a solid-state drive, an optical disk, or the like.

The foregoing descriptions are merely exemplary embodiments of the present application, but are not intended to limit the protection scope of the present application. Any variation or replacement readily figured out by a person skilled in the art within the technical scope disclosed in the present application shall all fall within the protection scope of the present application. Therefore, the protection scope of the present application shall be subject to the protection scope of the claims.

What is claimed is:

1. A method for an Ethernet power sourcing equipment to provide power to one or more Ethernet powered devices connected to the Ethernet power sourcing equipment, comprising:

when the Ethernet power sourcing equipment is in a first power supply mode, determining, by a controlling apparatus, high-power Ethernet powered device(s) and low-power Ethernet powered device(s) among the Ethernet powered devices, wherein when power requirement of an Ethernet powered device is greater than a set value, it is determined to be the high-power Ethernet powered device; otherwise, it is determined to be the low-power Ethernet powered device; wherein in the first power supply mode, the Ethernet power sourcing equipment preferentially supplies power to the low-power Ethernet powered device(s) and supplies power to a high-power Ethernet powered device only after power supply requirements of the low-power Ethernet powered device(s) are met; and setting, by the controlling apparatus, a power supply priority for each of the Ethernet powered devices, wherein the power supply priority of a high-power Ethernet powered device is set same as or lower than the lowest priority of the low-power Ethernet powered device(s); and when the Ethernet power sourcing equipment is in a second power supply mode, setting, by the controlling apparatus, according to a preset policy and regardless of the power requirements of the Ethernet powered devices, power supply priorities of the Ethernet powered devices, wherein the preset policy is one of the following:
  a power supply priority of an earlier-connected Ethernet powered device is higher than the power supply priority of a later-connected Ethernet powered device;
  a power supply priority of a later-connected Ethernet powered device is higher than the power supply priority of an earlier-connected Ethernet powered device; and
  a power supply priority of an Ethernet powered device is set according to a preset priority of an Ethernet port of the Ethernet power sourcing equipment to which the Ethernet powered device is connected; and
when a new Ethernet powered device is connected to the Ethernet power sourcing equipment, wherein a maximum output power of the Ethernet power sourcing equipment is a constant value,
  determining, by the controlling apparatus, a power requirement of the new Ethernet powered device;
  when the Ethernet power sourcing equipment is in the first power supply mode, setting, by the controlling apparatus, a power supply priority of the new Ethernet powered device according to the power requirement of the new Ethernet powered device;
  when the Ethernet power sourcing equipment is in the second power supply mode, setting, by the controlling apparatus, the power supply priority of the new Ethernet powered device according to the preset policy; and
  determining, by the controlling apparatus, whether the Ethernet power sourcing equipment supplies power to the new Ethernet powered device according to:
    the maximum output power of the Ethernet power sourcing equipment,
    an amount of power of the Ethernet power sourcing equipment being supplied to existing Ethernet powered devices,
    the power supply priorities of the existing Ethernet powered devices, and
    the power supply priority of the new Ethernet powered device.

2. The method according to claim 1, wherein the determining whether the Ethernet power sourcing equipment supplies power to the new Ethernet powered device comprises:
  determining a working state of the Ethernet power sourcing equipment according to the maximum output power of the Ethernet power sourcing equipment, a first power threshold, and the amount of power of the Ethernet power sourcing equipment being supplied to the existing Ethernet powered devices, wherein the working state is a normal state if the amount of power of the Ethernet power sourcing equipment being supplied to the existing Ethernet powered devices is less than or equal to the first power threshold, the working state is a high-load state if the amount of power of the Ethernet power sourcing equipment being supplied to the existing Ethernet powered devices is greater than the first power threshold and less than or equal to the maximum output power of the Ethernet power sourcing equipment, and the working state is a overload state if the amount of power of the Ethernet power sourcing equipment being supplied to the existing Ethernet powered devices is greater than the maximum output power of the Ethernet power sourcing equipment; and
  when the working state of the Ethernet power sourcing equipment is the high-load state, if the power supply priority of the new Ethernet powered device is higher than the power supply priority of at least one existing high-power Ethernet powered device, controlling the Ethernet power sourcing equipment to supply power to the new Ethernet powered device, and to cease supplying power to the existing high-power Ethernet powered device.

3. The method according to claim 2, wherein the determining whether the Ethernet power sourcing equipment supplies power to the new Ethernet powered device further comprises:
  when the working state is the overload state, controlling the Ethernet power sourcing equipment to cease supplying power to an existing Ethernet powered device with a lowest power supply priority among the existing Ethernet powered devices, and to refuse supplying power to the new Ethernet powered device, until the Ethernet power sourcing equipment reaches the normal working state.

4. The method according to claim 2, wherein the determining whether the Ethernet power sourcing equipment supplies power to the new Ethernet powered device further comprises:
  when the working state is the normal state, controlling the Ethernet power sourcing equipment to supply power to the new Ethernet powered device.

5. The method according to claim 1, wherein the set value is 30 watts (W).

6. An apparatus for controlling power supply over Ethernet to one or more Ethernet powered devices connected to an Ethernet power sourcing equipment, comprising a processing hardware platform executing instructions stored on a non-transitory computer-readable storage medium, to perform a process that comprises:
  when the Ethernet power sourcing equipment is in a first power supply mode, determining high-power Ethernet powered device(s) and low-power Ethernet powered device(s) among the Ethernet powered devices connected to the Ethernet power sourcing equipment, wherein when power requirement of an Ethernet powered device is greater than a set value, it is determined to be the high-power Ethernet powered device; otherwise, it is determined to be the low-power Ethernet powered device; wherein in the first power supply mode, the Ethernet power sourcing equipment preferentially supplies power to low-power Ethernet powered device(s) and supplies power to a high-power Ethernet powered device only after power supply requirements of the low-power Ethernet powered device(s) are met; and
  setting a power supply priority for each of the Ethernet powered devices, wherein the power supply priority of a high-power Ethernet powered device is set same as or lower than the lowest priority of the low-power Ethernet powered device(s); and
  when the Ethernet power sourcing equipment is in a second power supply mode, setting, by the controlling apparatus, according to a preset policy and regardless of the power requirements of the Ethernet powered devices, power supply priorities of the Ethernet powered devices, wherein the preset policy is one of the following:
    a power supply priority of an earlier-connected Ethernet powered device is higher than the power supply priority of a later-connected Ethernet powered device;

a power supply priority of a later-connected Ethernet powered device is higher than the power supply priority of an earlier-connected Ethernet powered device; and a power supply priority of an Ethernet powered device is set according to a preset priority of an Ethernet port of the Ethernet power sourcing equipment to which the Ethernet powered device is connected;

when a new Ethernet powered device is connected to the Ethernet power sourcing equipment, wherein a maximum output power of the Ethernet power sourcing equipment is a constant value, determining a power requirement of the new Ethernet powered device, and when the Ethernet power sourcing equipment is in the first power supply mode, setting a power supply priority of the new Ethernet powered device according to the power requirement of the new Ethernet powered device;

when the Ethernet power sourcing equipment is in the second power supply mode, setting the power supply priority of the new Ethernet powered device according to the preset policy; and determining whether the Ethernet power sourcing equipment supplies power to the new Ethernet powered device according to:

the maximum output power of the Ethernet power sourcing equipment, an amount of power of the Ethernet power sourcing equipment being supplied to existing Ethernet powered devices, the power supply priorities of the existing Ethernet powered devices, and the power supply priority of the new Ethernet powered device.

7. The apparatus according to claim 6, wherein in determining whether the Ethernet power sourcing equipment supplies power to the new Ethernet powered device, the processing hardware platform executes the instructions to perform:

determining a working state of the Ethernet power sourcing equipment according to the maximum output power of the Ethernet power sourcing equipment, a first power threshold, and the amount of power of the Ethernet power sourcing equipment being supplied to the existing Ethernet powered devices, wherein the working state is a normal state if the amount of power of the Ethernet power sourcing equipment being supplied to the existing Ethernet powered devices is less than or equal to the first power threshold, the working state is a high-load state if the amount of power of the Ethernet power sourcing equipment being supplied to the existing Ethernet powered devices is greater than the first power threshold and less than or equal to the maximum output power of the Ethernet power sourcing equipment, and the working state is a overload state if the amount of power of the Ethernet power sourcing equipment being supplied to the existing Ethernet powered devices is greater than the maximum output power of the Ethernet power sourcing equipment;

and when the working state of the Ethernet power sourcing equipment is the high-load state, if the power supply priority of the new Ethernet powered device is higher than the power supply priority of at least one existing high-power Ethernet powered device, controlling the Ethernet power sourcing equipment to supply power to the new Ethernet powered device, and to cease supplying power to the existing high-power Ethernet powered device.

8. The apparatus according to claim 7, wherein the processing hardware platform executes the instructions to further perform:

when the current working state is the overload state, controlling the Ethernet power sourcing equipment to cease supplying power to an existing Ethernet powered device with a lowest power supply priority among the existing Ethernet powered devices, and to refuse supplying power to the new Ethernet powered device, until the Ethernet power sourcing equipment reaches the normal working state.

9. The apparatus according to claim 7; wherein the processing hardware platform executes the instructions to further perform:

when the working state is the normal state, controlling the Ethernet power sourcing equipment to supply power to the new Ethernet powered device.

10. The apparatus according to claim 6, wherein the apparatus is a server connected to the Ethernet power sourcing equipment or an integrated part of the Ethernet power sourcing equipment, and wherein the Ethernet power sourcing equipment is a network switch or a router that supports the power over Ethernet.

11. The apparatus according to claim 6, wherein the set value is 30 watts (W).

12. An Ethernet power sourcing equipment capable of providing power over Ethernet to one or more Ethernet powered devices, said Ethernet power sourcing equipment comprising a plurality of Ethernet ports, a power supply circuit connected to the Ethernet ports, a processor connected to the power supply circuit, and a power requirement testing circuit connected to the processor, wherein:

the processor is configured to:

when the Ethernet power sourcing equipment is in a first power supply mode, determine high-power Ethernet powered device(s) and low-power Ethernet powered device(s) among the Ethernet powered devices connected to the Ethernet ports respectively, wherein when power requirement of an Ethernet powered device is greater than a set value, it is determined to be the high-power Ethernet powered device; otherwise, it is determined to be the low-power Ethernet powered device; wherein in the first power supply mode, the Ethernet power sourcing equipment preferentially supplies power to low-power Ethernet powered device(s) and supplies power to a high-power Ethernet powered device only after power supply requirements of the low-power Ethernet powered device(s) are met; and set a power supply priority for each of the Ethernet powered devices, wherein the power supply priority of a high-power Ethernet powered device is set same as or lower than the lowest priority of the low-power Ethernet powered device(s); and when the Ethernet power sourcing equipment is in a second power supply mode, set according to a preset policy and regardless of the power requirements of the Ethernet powered devices, power supply priorities of the Ethernet powered devices, wherein the preset policy is one of the following:

a power supply priority of an earlier-connected Ethernet powered device is higher than the power supply priority of a later-connected Ethernet powered device;

a power supply priority of a later-connected Ethernet powered device is higher than the power supply priority of an earlier-connected Ethernet powered device; and a power supply priority of an Ethernet powered device is set to a preset priority of an Ethernet port of the Ethernet power sourcing equipment to which the Ethernet powered device is connected;

when a new Ethernet powered device is connected to one of the Ethernet ports of the Ethernet power sourcing equipment, wherein a maximum output power of the Ethernet power sourcing equipment is a constant value, the power requirement testing circuit is configured to determine a power requirement of the new Ethernet powered device; and the processor is further configured to:

when the Ethernet power sourcing equipment is in the first power supply mode, set a power supply priority of the new Ethernet powered device according to the power requirement of the new Ethernet powered device;

when the Ethernet power sourcing equipment is in the second power supply mode, set the power supply priority of the new Ethernet powered device according to the preset policy; and determine whether the power supply circuit supplies power to the new Ethernet powered device according to:

the maximum output power of the Ethernet power sourcing equipment, an amount of power of the Ethernet power sourcing equipment being supplied to existing Ethernet powered devices, the power supply priorities of the existing Ethernet powered devices, and the power supply priority of the new Ethernet powered device.

13. The Ethernet power sourcing equipment according to claim 12, wherein in determining whether the power supply circuit supplies power to the new Ethernet powered device, the processor is configured to:

determine a working state of the Ethernet power sourcing equipment according to the maximum output power of the Ethernet power sourcing equipment, a first power threshold, and the amount of power of the Ethernet power sourcing equipment being supplied to the existing Ethernet powered devices, wherein the working state is a normal state if the amount of power of the Ethernet power sourcing equipment being supplied to the existing Ethernet powered devices is less than or equal to the first power threshold, the working state is a high-load state if the amount of power of the Ethernet power sourcing equipment being supplied to the existing Ethernet powered devices is greater than the first power threshold and less than or equal to the maximum output power of the Ethernet power sourcing equipment, and the working state is a overload state if the amount of power of the Ethernet power sourcing equipment being supplied to the existing Ethernet powered devices is greater than the maximum output power of the Ethernet power sourcing equipment; and when the working state of the Ethernet power sourcing equipment is the high-load state, if the power supply priority of the new Ethernet powered device is higher than the power supply priority of at least one existing high-power Ethernet powered device, control the power supply circuit to supply power to the new Ethernet powered device, and to cease supplying power to the existing high-power Ethernet powered device.

14. The Ethernet power sourcing equipment according to claim 13, wherein in determining whether the power supply circuit supplies power to the new Ethernet powered device, the processor is configured to:

when the current working state is the overload state, control the power supply circuit to cease supplying power to an existing Ethernet powered device with a lowest power supply priority among the existing Ethernet powered devices, and to refuse supplying power to the new Ethernet powered device, until the Ethernet power sourcing equipment reaches the normal working state.

15. The Ethernet power sourcing equipment according to claim 12, wherein the set value is 30 watts (W).

16. A power over Ethernet system, comprising an Ethernet power sourcing equipment and one or more Ethernet powered devices connected to the Ethernet power sourcing equipment, wherein the Ethernet power sourcing equipment comprises a plurality of Ethernet ports for connecting to the one or more Ethernet powered devices respectively, a power supply circuit connected to the Ethernet ports, a processor connected to the power supply circuit, and a power requirement testing circuit connected to the processor, wherein:

the processor is configured to: when the Ethernet power sourcing equipment is in a first power supply mode, determine high-power Ethernet powered device(s) and low-power Ethernet powered device(s) among the Ethernet powered devices, wherein when power requirement of an Ethernet powered device is greater than a set value, it is determined to be the high-power Ethernet powered device; otherwise, it is determined to be the low-power Ethernet powered device; and set a power supply priority for each of the Ethernet powered devices, wherein the power supply priority of a high-power Ethernet powered device is set same as or lower than the lowest priority of the low-power Ethernet powered device(s); and when the Ethernet power sourcing equipment is in a second power supply mode, set according to a preset policy and regardless of the power requirements of the Ethernet powered devices, power supply priorities of the Ethernet powered devices, wherein the preset policy is one of the following:

a power supply priority of an earlier-connected Ethernet powered device is higher than the power supply priority of a later-connected Ethernet powered device;

a power supply priority of a later-connected Ethernet powered device is higher than the power supply priority of an earlier-connected Ethernet powered device; and a power supply priority of an Ethernet powered device is set to a preset priority of an Ethernet port of the Ethernet power sourcing equipment to which the Ethernet powered device is connected;

when a new Ethernet powered device is connected to one of the Ethernet ports of the Ethernet power sourcing equipment, wherein a maximum output power of the Ethernet power sourcing equipment is a constant value, the power requirement testing circuit is configured to determine a power requirement of the new Ethernet powered device; and the processor is further configured to:

when the Ethernet power sourcing equipment is in the first power supply mode, set a power supply priority of the new Ethernet powered device according to the power requirement of the new Ethernet powered device;

when the Ethernet power sourcing equipment is in the second power supply mode, set the power supply priority of the new Ethernet powered device according to the preset policy; and determine whether the power supply circuit supplies power to the new Ethernet powered device according to:

the maximum output power of the Ethernet power sourcing equipment, an amount of power of the Ethernet power sourcing equipment being supplied to existing Ethernet powered devices, the power supply priorities of the existing Ethernet powered devices, and the power supply priority of the new Ethernet powered device.

* * * * *